United States Patent [19]

Aharoni et al.

[11] Patent Number: 4,568,720

[45] Date of Patent: Feb. 4, 1986

[54] PROCESS FOR PREPARING EXTENDED CHAIN POLYESTERS AND BLOCK OR GRAFT COPOLYESTERS

[75] Inventors: Shaul M. Aharoni, Morris Plains; Divakaran Masilamani, Morristown, both of N.J.

[73] Assignee: Allied Chemical Corporation, Morris Township, N.J.

[21] Appl. No.: 704,997

[22] Filed: Feb. 25, 1985

[51] Int. Cl.$^4$ .................. C08G 63/76; C08L 67/00
[52] U.S. Cl. .................................. 525/50; 525/418; 525/437; 528/287; 528/308.2
[58] Field of Search .............. 525/50, 418, 437; 528/287, 308.2

[56] References Cited

U.S. PATENT DOCUMENTS

| | | |
|---|---|---|
| 3,551,548 | 12/1970 | Brignac et al. |
| 3,776,806 | 12/1973 | Mayer et al. ............... 528/287 X |
| 4,031,165 | 6/1977 | Saiki et al. ............... 528/287 X |
| 4,390,667 | 6/1983 | Aharoni et al. |
| 4,417,031 | 11/1983 | Aharoni et al. |
| 4,417,032 | 11/1983 | Khanna et al. |

FOREIGN PATENT DOCUMENTS 569184 4/1941 United Kingdom.

Primary Examiner—Lucille M. Phynes
Attorney, Agent, or Firm—Richard C. Stewart; Gerhard H. Fuchs

[57] ABSTRACT

A process for preparing extended chain polyesters, and block or graft polyester or copolyesters by forming an intimate mixture of one or more polyesters and an effective amount of one or more phosphite compounds, and thereafter heating the intimate mixture at a temperature and for a time sufficient to form the desired amount of the desired polyester or co-polyester.

17 Claims, No Drawings

PROCESS FOR PREPARING EXTENDED CHAIN POLYESTERS AND BLOCK OR GRAFT COPOLYESTERS

BACKGROUND OF THE INVENTION

1. Field of the Invention

This invention relates to a process for preparing extended chain polyesters, and graft or block copolyesters. Extended chain polyesters, and block or graft co-polyesters prepared in accordance with the process of this invention are capable of being fabricated into useful shaped articles of manufacture, e.g., filaments, both mono- and multifilament, films, tapes, ribbons, rods, laminates, and the like.

2. Description of the Prior Art

Polymer compositions are disclosed in the prior art as having many and varied uses in industrial and commercial applications. For example, these polymers can be formed into filaments in which the polymer chains are oriented along the filament axis. Such filaments have many uses, in commercial applications, as for example, in the production of fibers for tire cord, textiles and the like. Similarly, these polymers can be fabricated into other useful shaped articles, as for example, films, gears, lawn mower housings, skate boards and the like, through use of conventional molding and fabrication techniques.

The utility of a particular polymer for a particular application is very much dependent on the physical properties of the polymer. For example, polymers having increased molecular weights form fibers and molded articles having superior properties. Fibers and molded articles made from such polymers have increased tensile strength, durability and impact resistance. Accordingly, processes for increasing the molecular weight of various polymers are valuable procedures in tailoring such polymers for optimization of such properties.

Similarly, various functional groups and polymer side chains, as well as the structural conformation of certain polymers, are factors which affect the physical characteristics of polymers and thus are also critical to the utility of these polymers. Thus, procedures for varying and controlling these functional groups, side chains and structural conformations are also valuable tools in tailoring polymers for specific uses and as such are valuable tools to those of skill in the polymer art.

U.S. Pat. No. 3,509,107 discloses a process for increasing the relative viscosity of polyamide or copoly-amide fibers by incorporating a phosphorous or phosphite compound into the polyamide or copolyamide under an inert gas atmosphere. The primary object is to provide a process for increasing the viscosity of polyamide yarn and cord which requires a minimim amount of inert gas. U.S. Pat. No. 3,551,548 describes various optimizing procedures for U.S. Pat. No. 3,509,107. The described patents are each directed only to a method of producing polyamide or copolyamide yarn with increased viscosity via incorporating a phosphorous or phosphite compound into the yarn, and then heating said yarn in the presence of inert gas.

British Pat. No. 569,184 discloses a method for producing a random copolymer from nylon 6 and nylon 66. That patent teaches that heating a mixture of nylon 6 and nylon 66 results in interchange between various sections of the respective polymer molecules with the final product being a random copolymer of nylon 6 and nylon 66. In order to produce a random copolymer of nylon 6 and nylon 66, British Pat. No. 569,184 teaches that it is necessary to heat the mixture of homopolymers for periods of time up to 8 hours at 285° C. without any catalyst.

U.S. Pat. No. 4,390,667 discloses a process for decreasing the melt index and increasing the viscosity of polyamide fibers via incorporating a phosphate compound into the polyamide and heating the polyamide until the desired changes in the melt index and viscosity occur. The phosphates utilized in U.S. Pat. No. 4,390,667 include substituted aryl phosphates which satisfy certain Hammett sigma values.

U.S. Pat. No. 4,417,031 discloses a process for preparing block and graft copolymers. The described process involves reacting two or more polyamides, polyesters, acid homopolymers of $\alpha,\beta$-unsaturated carboxylic acids in order to form a graft and/or block copolymer. Included in the application are copolymers formed from poly(caproamide) and poly(hexamethylene adipamide).

SUMMARY OF THE INVENTION

In accordance with this invention, there is provided a process for forming extended chain polyesters and block or graft polyesters or co-polyesters which comprises the steps of:

A. forming an intimate mixture of one or more polyesters, and an effective amount of one or more effective phosphite compounds;

B. heating said mixture for a time and at a temperature sufficient to form said extended chain, or graft or block co-polyester or polyester.

Another aspect of this invention relates to a polyester or co-polyesters prepared in accordance with the process of this invention.

DETAILED DESCRIPTION OF THE INVENTION

The process of this invention is conveniently carried out in two steps. The first step of the process consists of forming an intimate mixture of two or more appropriate polyesters and one or more effective phosphite compounds. In the second step of the process, the intimate mixture is heated at a temperature and for a time sufficient to form the desired extended chain polyester, or block or graft co-polyester or polyester. The formation of such polyester or co-polyester is indicated by a decrease in the melt index and an increase in the viscosity of the polymer mixture.

In a preferred embodiment of this invention, a molten mixture is formed in the first process step. As used herein, "molten mixture" is an intimate mixture which has been heated to a temperature which is equal to or greater than the melting point of at least one of the polymer components of the mixture. The manner in which the molten mixture is formed is not critical and conventional methods can be employed. For example, the molten mixture can be formed through use of conventional polymer and additive blending means, in which the polymeric components are heated to a temperature equal to or greater than the melting point of at least one of the polymers, and below the degradation temperature of each of the polymers. In a particularly preferred embodiment of this invention, the polymers are heated above the melting point of each of the polymers in the mixture. An effective amount of one or more phosphite compounds in a liquid or powdered form is added to the melted polymers while at the same time vigorously stirring the melt, or added prior to melting and mixing. Heating is continued until the desired extended chain, or block and/or graft polyester or co-polyester is formed as indicated by a decrease in the melt index and an increase in the viscosity.

In the most preferred embodiment, the components of the intimate mixture can be granulated, and the granulated components mixed dry in a suitable mixer, as for example, a tumbler or a Banbury Mixer, or the like, as uniformly as possible. Thereafter, the composition is heated in an extruder until the polymer components are melted. As described above, the mixture is heated until the desired extended chain, or block and/or graft copolyester or polyester is formed as indicated by a decrease in the melt index and an increase in the viscosity. Thereafter the mixture is ejected with cooling.

The order of mixing of the various components of the intimate mixture is not critical. Accordingly, the order of addition of the polymers and phosphite compounds and other optional components to be described in more detail hereinbelow, to form the intimate mixture, can be varied as desired.

The process can be carried out in a batchwise or discontinuous fashion, as for example, carrying out the process in a sealed container. Alternatively, the process can be carried out in a continuous fashion in a single processing zone, as for example, by use of an extruder as described hereinabove, or in a plurality of such reaction zones, in series or parallel.

Reaction temperature can be varied over a wide range. However, it should be appreciated that the process temperature employed in any specific instance will depend on the particular polyesters employed and, in the preferred embodiments should be at least as high as the melting point of semi-crystalline polyesters or the glass transition temperature of amorphous polyesters, and below the degradation temperature of such polyesters. In the preferred embodiments of this invention, the process temperature is such that the polyesters will remain in the molten state at the extended chain polyester, or block or graft polyester or copolyesters are formed. Normally this can be accomplished in one of two ways. Either the process can be carried out at a temperature which is equal to or greater than the melting point of the desired product; or process temperatures can be increased periodically over the course of the conduct of the process so as to maintain the mixture in the molten state. In the particularly preferred embodiments of this invention employing particularly preferred polyesters compositions, the process temperature is at least about 150° C. Amongst these particularly preferred embodiments, most preferred process temperatures are in the range of from about 200° C. to about 300° C.

Similarly, process pressures are not critical and can be varied widely without adversely affecting the process. Consequently, the process can be conducted at sub-atmospheric, atmospheric or super-atmospheric pressures. However, for convenience the process is carried out at atmospheric or autogeneous pressure.

The process is carried out for a time sufficicient to form the desired extended chain polyester, or block or graft polyester or co-polyester as is indicated by the decrease in the melt index and increase in the viscosity of the mixture. Reaction times can be varied over a wide range. Usually, reaction times will depend on a variety of factors such as the polymeric components, reaction temperatures, phosphite compound and its concentration, and other factors known to those of skill in the art to affect reaction times. In most instances, the reaction time can vary from a few seconds to 24 hours or more. In the preferred embodiments of this invention, reaction times will vary from about 1 min. to about 2 hours and in the particularly preferred embodiments from about 2 min. to about 30 to 60 min.

Best results are obtained when the process of this invention is carried out in the presence of as little water as possible. Ideally, the conditions will be anhydrous, and this represents the most preferred embodiment of the invention. However, good results can be obtained when as much as 0.165 weight percent water based on the total weight of the mixture is present therein. In the preferred embodiments, the weight percent of water is less than about 0.1 weight percent, and in the particularly preferred embodiments, the weight percent of water is less than about 0.05 weight percent on the same basis.

As used herein, "effective phosphite compounds" are aryl phosphite esters, or symmetrical or asymmetrical polyphosphite esters having more than one phosphite moiety wherein each moiety contains a substituted or unsubstituted phenyl group. Useful phosphite esters, and polyphosphite esters are known compounds. Such compounds can be conveniently prepared by reacting phosphorus trichloride and one or more alcohols at least one of which is an aromatic alcohol. For example, triphenyl phosphite can be prepared by reacting three moles of phenol with one mole of phosphorus trichloride, and trisnonyl phenol phosphite can be prepared by reacting three moles of trisnonyl phenol with one mole of phosphorus trichloride. Mixed phosphites such as diphenyl isodecyl phosphite, diphenyl isooctyl phosphite and phenyl diisodecyl phosphite, can be prepared by reacting an appropriate mixture of aromatic and aliphatic alcohols with phosphorus trichloride. Similarly, useful phosphites containing more than one phosphite ester moiety can be prepared by reacting aromatic and aliphatic alcohols at least one of which is polyhydric with phosphorus trichloride.

Illustrative of useful phosphite esters and polyphosphite esters are compounds of the formula:

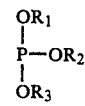

and asymmetrical and symmetrical phosphite derivatives thereof having more than one phosphite ester moiety wherein:

$R_1$, $R_2$ and $R_3$ are the same or different and are hydrogen, metal cations, ammonium radicals, or substituted or unsubstituted phenyl or alkyl wherein permissible substituents are one or more alkyl, alkoxy, cyano, nitro or halo groups, or $R_1$, $R_2$ and $R_3$ individually may form a moiety of the formula:

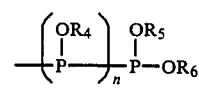

wherein n is 0 or a positive whole number, and $R_4$, $R_5$, and $R_6$ are the same or different and are $R_1$, $R_2$ and $R_3$, with the proviso that each phosphite moiety includes a substituted or unsubstituted phenyl group.

Permissible $R_1$, $R_2$ and $R_3$ groups include aliphatic groups such as t-butyl, n-butyl, isopropyl, hexyl, pentyl, 2-chloroethyl, neophentyl, decyl, dodecyl, isodecyl, butoxyethyl, 3-chlorobutyl and the like; aromatic groups such as 2,4-di-tert-butyl-phenyl, 4-tert-butylphenyl, 3-isopropylphenyl, 2,4-dimethylphenyl, 4-nonylphenyl, octylphenyl, 4-chlorophenyl, 2,4-dibromophenyl, 4-fluorophenyl, 3,5-dichlorophenyl, 4-cyanophenyl, 2-nitrophenyl and the like; metal cations such as sodium, potassium, zinc, lithium, calcium, aluminum, and the like and groups containing one or more phosphite moieties, as for example, ethylene diphenyl phosphite, or a poly-(dipropylene glycol) phenyl phosphite moiety bonded to the oxygen atom via the dipropylene glycol moiety.

Illustrative of useful phosphite esters within the scope of the above-structural formula are triphenyl phosphite, diphenyl phosphite, tris(nonylphenyl)phosphite, di-phenyl isodecyl phosphite, phenyl diisodecyl phosphite, diphenyl isooctyl phosphite, phenyl diisodecyl phosphite, poly(dipropylene glycol)phenyl phosphite, poly(4,4'-isopropylidene diphenol neopentyl alcohol phosphite), bis-(2,4-di-t-butylphenyl)-pentaerythritol diphosphite, and tris-(2,4-di-t-butylphenyl)phosphite.

Preferred for use in the practice of this invention are phosphite esters of the above formula in which:

$R_1$, $R_2$, and $R_3$ are the same or different and are a alkyl, phenyl or phenyl substituted with one or more alkyl groups, with the proviso that at least one of $R_1$, $R_2$, and $R_3$ is phenyl or substituted phenyl. Particularly preferred for use are such esters in which at least two of $R_1$, $R_2$, $R_3$ are phenyl or alkyl substituted phenyl, and most preferred for use are those esters in which $R_1$, $R_2$, and $R_3$ are the same or different and are alkyl substituted phenyl, such as trisnonyl phenyl or 2,4-di-tert butyl phenyl.

An effective amount of one or more effective phosphite compounds is employed in forming the intimate mixture. As used herein, "an effective amount" is an amount of the phosphite compounds which when added to the polymeric component in accordance with this invention forms a mixture which when heated forms the desired extended chain polyester, or block and/or graft polyester or co-polyester. The formation of the extended chain polyester, and block or graft polyester or copolyester will be accompanied by a decrease in the melt flow index of the mixture and an increase in the viscosity of the mixture. As used herein "melt flow index" denotes the rate of extrusion of the polymer mixture through an orifice. The lower the numerical value of the melt flow index the higher is the viscosity of the polymer melt, and conversely, the higher the numberical value of the melt the lower is the viscosity of the polymer melt. The melt flow index is measured in a melt indexer under conditions described and standardized as an ASTM Tentative Method of Measuring Flow Rates of Thermoplastics by Extrusion Plastometer (D1238). Manufacturers of melt index equipment meeting the ASTM requirements are: Appalachian Electronids Inc., Ronceverte, W. Va.; F. F. Slocomb Corporation, Wilmington, Del.; Tinius Olson Testing Machine Company, Willow Grove, Pa.; and W. J. Hacker and Company, Inc., West Caldwell, N.J. As used herein, "viscosity" denotes the internal friction, i.e. resistance to flow of the polymer mixture, and is well known in the art. A wide variety of viscometers are available for measurement of viscosity, such as capillary, rotational, orifice, falling ball, and oscillatory types. They are described in Barr, "A Monograph of Viscometry", Oxford, N.Y. (1931) and Kirk and Othmer, "Encyclopedia of Chemical Technology", Vol. 14, pp. 756–775 the Interscience Encyclopedia, Inc., New York (1955).

In the preferred embodiments of this invention, the quantity of the one or more phosphite compounds employed is at least about 0.05 weight percent, based on the total weight of the mixture. In the particularly preferred embodiments of this invention, the weight percent of phosphite compounds is in the range of from 0.1 to about 10 weight percent, and amongst these particularly preferred embodiments, those in which the quantity of phosphite compound employed is from about 0.4 to about 4 weight percent based on the total weight of the mixture are most preferred.

Polymers which may be employed in the process of this invention are linear or branched polyesters. The type of polyester is not critical and the particular polyester chosen for use in any particular situation will depend essentially on the physical properties and features, i.e. flexibility, hardness, toughness, desired in the final shaped article of manufacture. Thus, a multiplicity of linear thermoplastic polyesters having wide variations in physical properties are suitable for use in the process of this invention.

The particular polyester chosen for use can be a homo-polyester or a co-polyester, or mixtures thereof as desired. Polyesters are generally prepared by the condensation of an organic dicarboxylic acid and an organic dial, and, therefore, illustrative examples of useful polyesters will be described hereinbelow in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids. Illustrative of useful aromatic diols, are those having from about 6 to about 12 carbon atoms. Such aromatic diols include bis-(p-hydroxyphenyl)ether; bis-(p-hydroxyphenyl)thioether; (bis-(p-hydroxyphenyl)-sulphone); (bis-(p-hydroxyphenyl)-methane); 1,2-(bis-(p-hydroxyphenyl)-ethane); 1-phenyl-(bis-(p-hydroxyphenyl)-methane); diphenyl-(bis-(p-hydroxyphenyl)-methane); 2,2-bis(4'-hydroxy-3'-dimethylphenyl)propane); 1,1- or 2,2-(bis(p-hydroxyphenyl)-butane); 1,1-dichloro-or 1,1,1-trichloro-2,2-(bis-(p-hydroxyphenyl)-ethane); 1,1-(bis-(p-hydroxyphenyl)-cyclopentane); 2,2-(bis-(p-hydroxyphenyl)-propane (bisphenol A); 1,1-(bis-(p-hydroxyphenyl)-cyclohexane) (bisphenol C); p-xylene glycol; 2,5-dichloro-p-xylylene glycol; p-xylenediol; and the like.

Suitable cycloaliphatic diols include those having from about 5 to about 8 carbon atoms. Exemplary of such useful cycloaliphatic diols are 1,4-dihydroxy cyclohexane, 1,4-dihydroxy methylcyclohexane, 1,3-dihydroxy-cyclopentane, 1,5-dihydroxycycloheptane, 1,5-dihydroxycyclooctane, 1,4-cyclo-hexane dimethanol, and the like.

Useful and aliphatic diols include those having from about 2 to about 12 carbon atoms, with those having from about 2 to about 6 carbon atoms being particularly preferred. Illustrative of such preferred diol precursors are 1,2-propylene glycol, 1,3-propylene glycol, ethylene glycol, 1,8-octanediol, 1,4-nonanediol, neopentyl glycol, pentyl glycol, 1,6-hexanediol, 1,4-butanediol, and the like.

Cycloaliphatic diols and aliphatic diols are preferred for use. Propylene glycol, ethylene glycol, neopentyl diol, 1,4-dihydroxy methylcyclohexane, and 1,4-butanediol are particularly preferred as diol precursors of polyesters for use in the conduct of this invention.

Suitable dicarboxylic acids for use as precursors in the preparation of useful polyesters are linear and branched chain saturated aliphatic dicarboxylic acids, aromatic dicarboxylic acids and cycloaliphatic dicarboxylic acids. Polyesters containing up to about 80% repeat units of monomer containing both hydroxyl and carboxyl groups, such as hydroxyl benzoic acid, vanillic acid, syringic acid and the like, may also be used in the practice of this invention. Illustrative of aliphatic dicarboxylic acids which can be used in this invention are those having from about 2 to about 50 carbons atoms, as for example, oxalic acid, malonic acid, dimethylmalonic acid, succinic acid. octadecysuccinic acid, pimelic acid, adipic acid, trimethyladipic acid, sebacic acid, suberic acid, azelaic acid and dimeric acids (dimerisation products of unsaturated aliphatic carboxylic acids such as oleic acid) and alkylated malonic and succinic acids, such as octadecylsuccinic acid, and the like.

Illustrative of suitable cycloaliphatic dicarboxylic acids are those having from about 6 to about 15 carbon atoms. Such useful cycloaliphatic dicarboxylic acids include 1,3-cyclobutanedicarboxylic acid, 1,2-cyclopentanedicarboxylic acid, 1,3- and 1,4-cyclohexanedicarboxylic acid, 1,3- and 1,4-dicarboxymethylcyclohexane and 4,4'-dicycloexyldicarboxylic acid, and the like.

Polyester compounds prepared from the condensation of a diol and an aromatic dicarboxylic acid are preferred for use in this invention. Illustrative of such useful aromatic carboxylic acids are terephthalic acid, isophthalic acid and a o-phthalic acid, 1,3-, 1,4-, 2,6-or 2,7-naphthalenedicarboxylic acid, 4,4'-diphenyldicarboxylic acid, 4,4'-diphenylsulphone-dicarboxylic acid, 1,1,3-trimethyl-5-carboxy-3-(p-carboxyphenyl)-indane, diphenyl ether 4,4'-dicarboxylic acid bis-p(carboxyphenyl)methane and the like. Of the aforementioned aromatic dicarboxylic acids based on a benzene ring such as terephthalic acid, isophthalic acid orthophthalic acid are preferred for use and amongst these preferred acid precursors, terephthalic acid is particularly preferred.

In the most preferred embodiments of this invention, poly(ethylene terephthalate), poly(butylene terephthalate), and poly(1,4-cyclohexane dimethylene terephthalate), are the polyesters of choice. Among these polyesters of choice, poly(ethylene terephthalate) is most preferred.

Various other optional ingredients, which are normally included in polymer compositions, may be added to the mixture at an appropriate time during the conduct of the process. For example, these optional ingredients can be added either prior to or after melting of the polymers in the first step of the process of this invention; or after the conduct of the second step in which the desired block and/or graft co-polyester have been formed. Such optional components include fillers, plasticizers, crystallization nucleating agents, impact modifiers, colorants, mold release agents, antioxidants, ultraviolet light stabilizers, lubricants, antistatic agents, fire retardants, and the like. These optional components are well known to those of skill in the art, accordingly, only the preferred optional components will be described herein in detail.

The extended chain polyesters, and block or graft polyesters or copolyesters prepared in the process of this invention preferably include a particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and mixtures thereof. Examples of such useful fillers include glass fibers, alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, and the like such fillers are well known materials and are readily available. The foregoing recited fillers are illustrative only and are not meant to limit the scope of the fillers that can be employed in this invention. In the preferred embodiments of this invention fibrous materials are the fillers of choice, and glass fiber is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer and phosphite components, and in the particularly preferred embodiment is in the range of from about 30 to about 110 weight percent on the same basis.

It is also very desirable to include plasticizers of the types known in the art for use with polymer composition. Useful plasticizers may vary widely and will depend on the type of polymers employed, and other factors known to those of skill in the art.

The process of this invention provides extended chain polyesters and graft and/or block polyesters or co-polyesters having decreased melt indexes and increased viscosities. Such polymers are useful as tire cord in pneumatic tires, and in the manufacture of films and molded parts. Such uses for polyester materials are well known in the art and will not be described herein in great detail.

The following specific examples are presented to more particularly illustrate the invention, and should not be construed as being limitations on the scope and spirit of the invention.

EXAMPLES I TO XXXIX

In these examples, various representative embodiments of this invention were carried out employing the following general mixing and extrusion procedures.

A. Mixing

The polyesters were in the form of ⅛" (0.3175 cm) pellets. After weighing in wide-mouth jars, the polyester samples were dried for 16 hours at 100°-110° C. in a vacuum oven. This drying step was done prior to blending, and the samples were kept in sealed jars during interim periods to maintain dryness. Weighed amounts of the phosphite additives were added to the polymers and the sealed jars were rotated on a rolling mill for 0.5 hr. This rotation action effectively coated the surface of the pellets with the phosphite additives.

B. Extrusion

Melt blending was accomplished using a Wayne extruder with a mixing screw 1" (2.54 cm) diameter and 25" (63.5 cm) long operated at an extrusion temperature greater than the melting points of both semicrystalline polymers or the glass transition temperature in case of amorphous polyesters. Extrusion rates were controlled by a variable speed motor. The single strand extrudate proceeded from the die into a cooling water bath and after solidifying, to a small Wayne pelletizer. Alternatively, the extrudate can be cooled in a stream of air at room temperature.

Pellets were vaccum dried and subjected to a relative viscosity determination for evaluation of the extended chain polyester or block or graft co-polyester formation. Reduced viscosity was measured at 23° C., 0.5% concentration of polymer in 60:40 phenol/tetrachloroethane solvent mixture. The percent composition of the resulting polymer compositions, based on the total weight, and their physical properties, i.e. intrinsic viscosity [η], are set forth in the following TABLE I. In the table, the abbreviations used are defined as follows:

(a) "PET" is polyethylene terephthalate.
(b) "TBP" is tributyl phosphite.
(c) "DPP" is diphenyl phosphite.
(d) "TPP" is triphenyl phosphite.
(e) "TNPP" is tris(nonylphenyl)phosphite.
(f) "PBT" is polybutylene terephthalate.
(g) "KA" is poly(dimethylcyclohexylene tere/isophthalate).
(h) "C" indicates a comparison example.

TABLE I

| Ex. | Polyester(s) | WEIGHT % PHOSPHITE | T (°C.) | Original Viscosity [η 3] | New Viscosity [η 3] | Time (min.) |
|---|---|---|---|---|---|---|
| I | PET | 1.5% TPP | 305 | 0.68 | 0.69 | 2.5 |
| II | PET | 1.5% TPP | 305 | 0.68 | 0.77 | 5.0 |
| III | PET | 1.5% TPP | 305 | 0.68 | 0.79 | 7.5 |
| IV | PET | 1.5% TPP | 305 | 0.68 | 0.81 | 10.0 |
| V | PET | 1.5% TPP | 285 | 0.68 | 0.75 | 1.50 |
| VI | PET | 1.5% TPP | 285 | 0.68 | 0.75 | 1.88 |
| VII | PET | 1.5% TPP | 285 | 0.68 | 0.78 | 2.5 |
| VIII | PET | 1.5% TPP | 285 | 0.68 | 0.80 | 3.75 |
| IX | PET | 1.5% TPP | 285 | 0.68 | 0.81 | 5.0 |
| X | PET | 1.5% TPP | 285 | 0.68 | 0.86 | 7.5 |
| XI | PET | 1.5% TPP | 285 | 0.68 | 0.87 | 10.0 |
| XII | PET | 1.5% TPP | 285 | 0.68 | 0.90 | 15.0 |
| XIII | PET | 1.5% TPP | 268 | 0.68 | 0.79 | 1.50 |
| XIV | PET | 1.5% TPP | 265 | 0.68 | 0.82 | 1.88 |
| XV | PET | 1.5% TPP | 265 | 0.68 | 0.84 | 2.5 |
| XVI | PET | 1.5% TPP | 265 | 0.68 | 0.88 | 3.75 |
| XVII | PET | 1.5% TPP | 265 | 0.68 | 0.92 | 5.0 |
| XVIII | PET | 1.5% TPP | 265 | 0.68 | 0.95 | 7.5 |
| XIX | PET | 1.5% TPP | 265 | 0.68 | 1.03 | 10.0 |
| XX | PET | 1.5% TPP | 265 | 0.68 | 1.03 | 15.0 |
| XXI | PET | 1.5% TPP | 265 | 0.68 | 1.07 | 30.0 |
| XXII | PET | 0% TPP | 285 | 0.70 | 0.69 | 5.0 |
| XXIII | PET | 0.5% TPP | 285 | 0.70 | 0.79 | 5.0 |
| XXIV | PET | 1.0% TPP | 285 | 0.70 | 0.84 | 5.0 |
| XXV | PET | 1.5% TPP | 285 | 0.70 | 0.87 | 5.0 |
| XXVI | PET | 2.0% TPP | 285 | 0.70 | 0.90 | 5.0 |
| XXVII | PET | 2.5% TPP | 285 | 0.70 | 0.93 | 5.0 |
| CXXVIII | PET | 0% TPP | 265 | 0.68 | 0.60 | 12.5 |
| CXXIX | PET | 0% TPP | 265 | 0.68 | 0.67 | 12.5 |
| CXXX | PET | 1.0% TBP | 265 | 0.68 | 0.60 | 12.5 |
| XXXI | PET | 1.0% DPP | 265 | 0.68 | 0.80 | 12.5 |
| XXXII | PET | 3.0% TNPP | 265 | 0.68 | 0.68 | 12.5 |
| XXXIII | PET | 3.0% TNPP | 285 | 0.68 | 0.82 | 12.5 |
| XXXIV | PET | 1.5% TPP | 265 | 0.68 | 0.75 | 12.5 |
| XXXV | PET | 1.5% TPP | 285 | 0.68 | 0.85 | 12.5 |
| CXXXVI | PET | 0% TPP | 300 | 1.06 | 1.00 | 7.5 |
| XXXVII | PET | 1.0% TPP | 300 | 1.06 | 1.23 | 7.5 |
| CXXXVIII | KA | 0% TPP | 285 | 0.75 | 0.70 | 10.0 |
| XXXIX | KA | 0.5% TPP | 285 | 0.75 | 1.10 | 10.0 |

The foregoing detailed description of the invention has been given for clearness of understanding only, and no unnecessary limitations are to be understood therefrom. The invention is not limited to the exact details herein shown and described, and will encompass obvious modifications which will occur to those of skill in the art in light of the appended claims.

What is claimed is:

1. A process for preparing extended chain polyesters, and block and/or graft polyesters or co-polyesters which comprises:
   a. forming an intimate mixture of one or more polyesters and an effective amount of one or more effective phosphite compounds; and
   b. heating said mixture for a time and at a temperature sufficient to form any amount of said extended chain polyesters, or block and/or graft polyesters or copolyesters.

2. A process according to claim 1 wherein said mixture is a molten mixture.

3. The process of claim 1 wherein the polyester contain terephthalate moieties and aliphatic dioxy moieties of from about 2 to about 6 carbons.

4. The process of claim 3 wherein the polyester is poly(ethylene terephthalate).

5. The process of claim 3 wherein the polyester is poly(1,4-butylene terephthalate).

6. The process of claim 1 wherein the polyester contains isophthalate moieties.

7. The process of claim 1 wherein the polyester is poly(tereisophthalate cyclohexane dimethanol).

8. The process of claim 1 wherein said effective phosphite compounds are selected from the group consisting of monophosphite and polyphosphite esters of the formula:

wherein:
$R_1, R_2$ and $R_3$ are the same or different and are hydrogen, metal cations, ammonium radicals or substituted or unsubstituted phenyl or alkyl groups wherein permissible substituents are one or more alkyl, alkoxy, cyano, nitro or halo groups, or $R_1$, $R_2$, and $R_3$ individually may form a moiety of the formula:

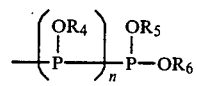

wherein:
n is 0 or a positive whole number; and $R_4$, $R_5$, and $R_6$ are the same or different and are $R_1$, $R_2$, and $R_3$; with the proviso that each phosphite moiety includes a substituted or unsubstituted phenyl group.

9. The process of claim 8 wherein said phosphite ester compounds are a monophosphite ester of the formula

wherein:
$R_1$, $R_2$, and $R_3$ are the same or different and are alkyl, phenyl or phenyl substituted with one or more alkyl groups, with the proviso that at least one of $R_1$, $R_2$, and $R_3$ is phenyl or substituted phenyl.

10. The process of claim 9 wherein $R_1$, $R_2$ and $R_3$ are phenyl or substituted phenyl.

11. A process according to claim 9 wherein $R_1$, $R_2$ and $R_3$ are the same.

12. A process according to claim 8 wherein said phosphite ester compounds are monophosphite esters wherein $R_1$, $R_2$ and $R_3$ are selected from the group consisting of phenyl or phenyl substituted with chloro, alkyl having from 1 to about 18 carbon atoms or haloalkyl having from 1 to about 6 carbon atoms.

13. A process according to claim 10 wherein $R_1$, $R_2$ and $R_3$ are selected from the group consisting of phenyl, 2,4-di-tert-butylphenyl, and 4-nonylphenyl.

14. A process according to claim 1 wherein the amount of said one or more phosphite compounds is at least about 0.05 weight percent based on the total weight of the mixture.

15. A process according to claim 14 wherein said amount is from about 0.1 to about 10 weight percent.

16. A process according to claim 15 wherein said amount is from about 0.4 to about 3 weight percent.

17. A polyester or co-polyester prepared in accordance with the process of claim 1.

* * * * *